United States Patent
Fujishiro et al.

(10) Patent No.: US 12,495,348 B2
(45) Date of Patent: Dec. 9, 2025

(54) COMMUNICATION CONTROL METHOD

(71) Applicant: KYOCERA Corporation, Kyoto (JP)

(72) Inventors: Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 421 days.

(21) Appl. No.: 18/057,033

(22) Filed: Nov. 18, 2022

(65) Prior Publication Data

US 2023/0080014 A1   Mar. 16, 2023

Related U.S. Application Data

(63) Continuation of application No. PCT/JP2021/019068, filed on May 19, 2021.

(60) Provisional application No. 63/027,634, filed on May 20, 2020.

(51) Int. Cl.
*H04J 3/08*   (2006.01)
*H04W 36/00*   (2009.01)
*H04W 36/36*   (2009.01)

(52) U.S. Cl.
CPC ..... *H04W 36/362* (2023.05); *H04W 36/0064* (2023.05)

(58) Field of Classification Search
CPC ........... H04W 36/362; H04W 36/0064; H04W 36/305; H04W 76/19
See application file for complete search history.

(56) References Cited

U.S. PATENT DOCUMENTS

| | | | |
|---|---|---|---|
| 2020/0267795 A1* | 8/2020 | Jung | H04W 36/16 |
| 2021/0321315 A1* | 10/2021 | Yi | H04W 76/18 |
| 2021/0360496 A1* | 11/2021 | Ishii | H04W 36/362 |
| 2021/0378041 A1* | 12/2021 | Narasimha | H04W 76/19 |
| 2022/0007212 A1* | 1/2022 | Hwang | H04W 76/19 |
| 2022/0015176 A1* | 1/2022 | Ishii | H04W 24/04 |
| 2022/0039188 A1* | 2/2022 | Ishii | H04W 76/19 |
| 2022/0070696 A1* | 3/2022 | Jung | H04W 24/04 |
| 2022/0070959 A1* | 3/2022 | Jung | H04W 24/04 |
| 2022/0095194 A1* | 3/2022 | Sheng | H04W 76/19 |

(Continued)

FOREIGN PATENT DOCUMENTS

| | | | | |
|---|---|---|---|---|
| WO | WO-2020067517 A1 * | 4/2020 | | H04W 24/08 |
| WO | WO-2020171750 A1 * | 8/2020 | | H04L 45/28 |

(Continued)

OTHER PUBLICATIONS

ZTE, Sanechips; "Discussion on IAB BH RLF Handling"; 3GPP TSG RAN WG2 Meeting #106; R2-1906575; May 13-17, 2019; pp. 1-6; Reno, USA.

(Continued)

*Primary Examiner* — Thai Dinh Hoang
(74) *Attorney, Agent, or Firm* — Studebaker Brackett PLLC

(57) ABSTRACT

A communication control method is used in a cellular communication system. The communication control method includes receiving, by a communication apparatus, from a relay node, a failure occurrence notification indicating occurrence of a failure in a backhaul link between the relay node and a parent node of the relay node, and starting, by the communication apparatus, a timer defining a time to wait for recovery from the failure in response to receiving the failure occurrence notification.

3 Claims, 16 Drawing Sheets

(56) References Cited

U.S. PATENT DOCUMENTS

| | | | |
|---|---|---|---|
| 2022/0110179 A1* | 4/2022 | Sheng | B65D 5/4204 |
| 2022/0132388 A1* | 4/2022 | Ishii | H04W 76/19 |
| 2022/0182903 A1* | 6/2022 | Ishii | H04W 36/0058 |
| 2022/0201513 A1* | 6/2022 | Wei | H04W 40/24 |
| 2022/0217598 A1* | 7/2022 | Ishii | H04W 36/0058 |
| 2023/0089657 A1* | 3/2023 | Ishii | H04W 36/0079 |
| 2023/0098848 A1* | 3/2023 | Ishii | H04W 36/0033 |
| | | | 370/216 |
| 2023/0164658 A1* | 5/2023 | Ishii | H04W 36/0055 |
| | | | 370/331 |

FOREIGN PATENT DOCUMENTS

| | | | | |
|---|---|---|---|---|
| WO | WO-2021204835 A1 * | 10/2021 | | H04W 74/0833 |
| WO | WO-2021220937 A1 * | 11/2021 | | H04W 36/00 |

OTHER PUBLICATIONS

Huawei, HiSilicon; "Backhaul RLF Recovery"; 3GPP TSG-RAN WG2#106; R2-1906070; Revision of R2-1905171; May 13-17, 2019; pp. 1-6; Reno, USA.

Kyocera; "Further Discussion on Backhaul RLF Handling"; 3GPP TSG-RAN WG2 #107; R2-1909635; Aug. 26-30, 2019; pp. 1-7; Prague, Czech Republic.

Kyocera; "Possible Issues on Backhaul RLF Handling"; 3GPP TSG-RAN WG2 #109bis-e; R2-2003314; Resubmission of R2-2000516; Apr. 20-30, 2020; pp. 1-7; Online.

\* cited by examiner 9.2.7   Radio Link Failure

In RRC_CONNECTED, the UE performs Radio Link Monitoring (RLM) in the active BWP based on reference signals (SSB/CSI-RS) and signal quality thresholds configured by the network. SSB-based RLM is based on the SSB associated to the initial DL BWP and can only be configured for the initial DL BWP and for DL BWPs containing the SSB associated to the initial DL BWP. For other DL BWPs, RLM can only be performed based on CSI-RS. In case of DAPS handover, the UE continues the RLM at the source cell until the successful completion of the random access procedure to the target cell.

The UE declares Radio Link Failure (RLF) when one of the following criteria are met:
- Expiry of a radio problem timer started after indication of radio problems from the physical layer (if radio problems are recovered before the timer is expired, the UE stops the timer); or
- Expiry of a timer started upon triggering a measurement report for a measurement identity for which the timer has been configured while another radio problem timer is running; or
- Random access procedure failure; or
- RLC failure; or
- Detection of consistent uplink LBT failures for operation with shared spectrum channel access as described in 5.6.1; or
- For IAB-MT, the reception of BH RLF indication received from its parent node.

...

In case of CHO, after RLF is declared in source cell, the UE:
- stays in RRC_CONNECTED;
- selects a suitable cell and if the selected cell is a CHO candidate and if network configured the UE to try CHO after RLF then the UE attempts CHO execution once, otherwise re-establishment is performed;
- enters RRC_IDLE if a suitable cell was not found within a certain time after RLF was declared.

When RLF occurs at the IAB BH link, the same mechanisms and procedures are applied as for the access link. This includes BH RLF detection and RLF recovery ~~using RRC reestablishment procedure~~.

In case the RRC reestablishment procedure fails, the IAB-node may transmit an BH RLF indication to its child nodes. The BH RLF indication is transmitted on the BAP sublayer.

FIG. 14

5.3.5.13.4 Conditional configuration evaluation

The UE shall:
  1> for IAB-MT, if BH RLF indication received on BAP entity:

2> consider the RSRP of the cell which sent BH RLF indication as minus infinity;

1> for each *condConfigId* within the *VarConditionalConfig*:

2> consider the cell which has a physical cell identity matching the value indicated in the *ServingCellConfigCommon* included in the *reconfigurationWithSync* in the received *condRRCReconfig* to be applicable cell;

2> for each *measId* included in the *measIdList* within *VarMeasConfig* indicated in the *condExecutionCond* associated to *condConfigId*:

3> if the entry condition(s) applicable for this event associated with the *condConfigId*, i.e. the event corresponding with the *condEventId(s)* of the corresponding *condTriggerConfig* within *VarConditionalConfig*, is fulfilled for the applicable cells for all measurements after layer 3 filtering taken during the corresponding *timeToTrigger* defined for this event within the *VarConditionalConfig*:

4> consider the event associated to that *measId* to be fulfilled;

3> if the leaving condition(s) applicable for this event associated with the *condConfigId*, i.e. the event corresponding with the *condEventId(s)* of the corresponding *condTriggerConfig* within *VarConditionalConfig*, is fulfilled for the applicable cells for all measurements after layer 3 filtering taken during the corresponding *timeToTrigger* defined for this event within the *VarConditionalConfig*:

4> consider the event associated to that *measId* to be not fulfilled;

2> if trigger conditions for all associated *measId(s)* within *condTriggerConfig* are fulfilled for all associated *measId(s)* in *condTriggerConfig*:

3> consider the target candidate cell within the stored *condRRCReconfig*, associated to that *condConfigId*, as a triggered cell;

3> initiate the conditional configuration execution, as specified in 5.3.5.13.5;

NOTE:   Up to 2 *MeasId* can be configured for each *condConfigId*. The conditional handover event of the 2 *MeasId* may have the same or different event conditions, triggering quantity, time to trigger, and triggering threshold.

FIG. 15

5.3.5.13.4 Conditional configuration evaluation

The UE shall:

1> for each *condConfigId* within the *VarConditionalConfig*:

2> consider the cell which has a physical cell identity matching the value indicated in the *ServingCellConfigCommon* included in the *reconfigurationWithSync* in the received *condRRCReconfig* to be applicable cell;

2> for each *measId* included in the *measIdList* within *VarMeasConfig* indicated in the *condExecutionCond* associated to *condConfigId*:

3> if the entry condition(s) applicable for this event associated with the *condConfigId*, i.e. the event corresponding with the *condEventId(s)* of the corresponding *condTriggerConfig* within *VarConditionalConfig*, is fulfilled for the applicable cells for all measurements after layer 3 filtering taken during the corresponding *timeToTrigger* defined for this event within the *VarConditionalConfig*:

3> or for IAB-MT, if BH RLF indication received on BAP entity:

4> consider the event associated to that *measId* to be fulfilled;

3> if the leaving condition(s) applicable for this event associated with the *condConfigId*, i.e. the event corresponding with the *condEventId(s)* of the corresponding *condTriggerConfig* within *VarConditionalConfig*, is fulfilled for the applicable cells for all measurements after layer 3 filtering taken during the corresponding *timeToTrigger* defined for this event within the *VarConditionalConfig*:

4> consider the event associated to that *measId* to be not fulfilled;

2> if trigger conditions for all associated *measId*(s) within *condTriggerConfig* are fulfilled for all associated *measId*(s) in *condTriggerConfig*:

3> consider the target candidate cell within the stored *condRRCReconfig*, associated to that *condConfigId*, as a triggered cell;

3> initiate the conditional configuration execution, as specified in 5.3.5.13.5;

NOTE: Up to 2 *MeasId* can be configured for each *condConfigId*. The conditional handover event of the 2 *MeasId* may have the same or different event conditions, triggering quantity, time to trigger, and triggering threshold.

FIG. 16

COMMUNICATION CONTROL METHOD

RELATED APPLICATIONS

The present application is a continuation based on PCT Application No. PCT/JP2021/019068, filed on May 19, 2021, which claims the benefit of U.S. Provisional Application No. 63/027,634 filed on May 20, 2020. The content of which is incorporated by reference herein in their entirety.

TECHNICAL FIELD

The present disclosure relates to a communication control method used in a cellular communication system.

BACKGROUND OF INVENTION

The 3rd Generation Partnership Project (3GPP), which is a standardization project of a cellular communication system, has been studying introduction of a new relay node referred to as an Integrated Access and Backhaul (IAB) node. One or more relay nodes are involved in communication between a base station and user equipment, and perform relay for the communication.

SUMMARY

A communication control method according to a first aspect is a method used in a cellular communication system. The communication control method includes receiving, by a communication apparatus, from a relay node, a failure occurrence notification indicating occurrence of a failure in a backhaul link between the relay node and a parent node of the relay node, and starting, by the communication apparatus, a timer defining a time to wait for recovery from the failure in response to receiving the failure occurrence notification.

A communication control method according to a second aspect is a method used in a cellular communication system. The communication control method includes receiving, by a first relay node configured with conditional handover from a second relay node being a parent node of the first relay node, a notification based on a failure in a backhaul link between the second relay node and a parent node of the second relay node, and performing, by the first relay node, processing for forcibly triggering the conditional handover based on the notification.

A communication control method according to a third aspect is a method used in a cellular communication system. The communication control method includes receiving, by a first relay node configured with conditional handover from a second relay being a parent node of the first relay node, a failure occurrence notification indicating occurrence of a failure in a backhaul link between the second relay node and a parent node of the second relay node, and performing, by the first relay node, evaluation of a trigger condition for the conditional handover, based on the failure occurrence notification even when the first relay node has not received, from the second relay node, a recovery failure notification indicating failed recovery from the failure.

BRIEF DESCRIPTION OF THE DRAWINGS

FIG. 14 is a diagram illustrating an example of specification change related to Proposal 1.

FIG. 15 is a diagram illustrating an example of specification change related to Option 1.

FIG. 16 is a diagram illustrating an example of specification change related to Option 2.

DESCRIPTION OF EMBODIMENTS

A cellular communication system according to an embodiment will be described with reference to the drawings. In the description of the drawings, the same or similar parts are denoted by the same or similar reference signs.

Configuration of Cellular Communication System

Figure 1:
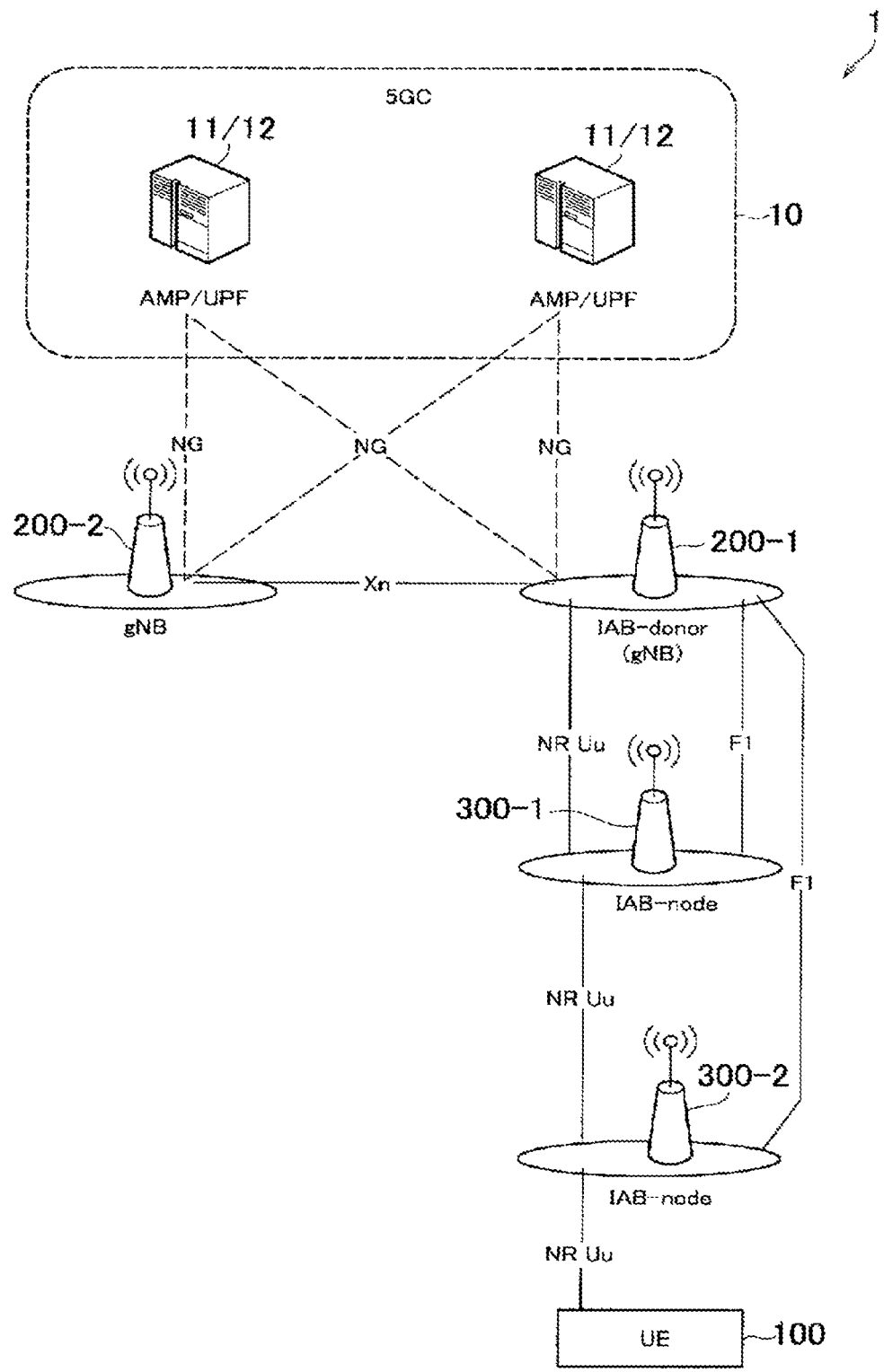
FIG. 1 is a diagram illustrating a configuration of a cellular communication system according to an embodiment.

First, a configuration of the cellular communication system according to an embodiment will be described. FIG. 1 is a diagram illustrating a configuration of a cellular communication system 1 according to an embodiment.

The cellular communication system 1 is a fifth generation (5G) cellular communication system based on the 3GPP standard. Specifically, a radio access scheme in the cellular communication system 1 is New Radio (NR) being a radio access scheme of the 5G. Note that Long Term Evolution (LTE) may be at least partially applied to the cellular communication system 1.

As illustrated in FIG. 1, the cellular communication system 1 includes a 5G core network (5GC) 10, user equipment (UE) 100, a base station (referred to as a gNB) 200, and an IAB node 300. The IAB node 300 is an example of a relay node.

An example in which the base station is an NR base station will be mainly described below. However, the base station may be an LTE base station (i.e., an eNB).

The 5GC 10 includes an Access and Mobility Management Function (AMF) 11 and a User Plane Function (UPF) 12. The AMF 11 is an apparatus that performs various types of mobility controls and the like for the UE 100. By communicating with the UE 100 by using Non-Access Stratum (NAS) signaling, the AMF 11 manages information of an area in which the UE 100 exists. The UPF 12 is an apparatus that performs transfer control of user data and the like.

Each gNB 200 is a fixed wireless communication node and manages one or more cells. The term "cell" denotes a minimum unit of a wireless communication area. The term "cell" may denote a function or a resource for performing wireless communication with the UE 100. One cell belongs to one carrier frequency.

Each gNB 200 is connected to the 5GC 10 each other via an interface referred to as an NG interface. FIG. 1 illustrates an example of two gNBs, a gNB 200-1 and a gNB 200-2 that are connected to the 5GC 10.

Each gNB 200 is interconnected to another neighboring gNB 200 via an inter-base station interface referred to as an Xn interface. FIG. 1 illustrates an example in which the gNB 200-1 is connected to the gNB 200-2.

Each gNB 200 may be divided into a central unit (CU) and a distributed unit (DU). The CU and the DU are interconnected via an interface referred to as an F1 interface. The F1 protocol is a communication protocol between the CU and the DU, and includes an F1-C protocol corresponding to a protocol for a control plane and an F1-U protocol corresponding to a protocol for a user plane.

The cellular communication system 1 supports an IAB that uses NR for the backhaul to enable wireless relay of NR access. The donor gNB 200-1 is a gNB 200 corresponding to a terminal node of the NR backhaul on the network side and including additional functions that support the IAB. The backhaul is capable of multi-hop via a plurality of hops (i.e., a plurality of IAB nodes 300).

An example is illustrated in FIG. 1 in which an IAB node 300-1 is wirelessly connected to the donor gNB 200-1, an IAB node 300-2 is wirelessly connected to the IAB node 300-1, and the F1 protocol is transmitted via two backhaul hops.

The UE 100 is a mobile wireless communication apparatus that can perform wireless communication with cells. The UE 100 may be any type of apparatus as long as the UE 100 is an apparatus that performs wireless communication with the gNB 200 or the IAB node 300. For example, the UE 100 is a mobile phone terminal, a tablet terminal, a notebook PC, a sensor or an apparatus provided in the sensor, and/or a vehicle or an apparatus provided in the vehicle. The UE 100 is wirelessly connected to the IAB node 300 or the gNB 200 via an access link. FIG. 1 illustrates an example in which the UE 100 is wirelessly connected to the IAB node 300-2. The UE 100 indirectly communicates with the donor gNB 200-1 via the IAB node 300-2 and the IAB node 300-1.

Figure 2:
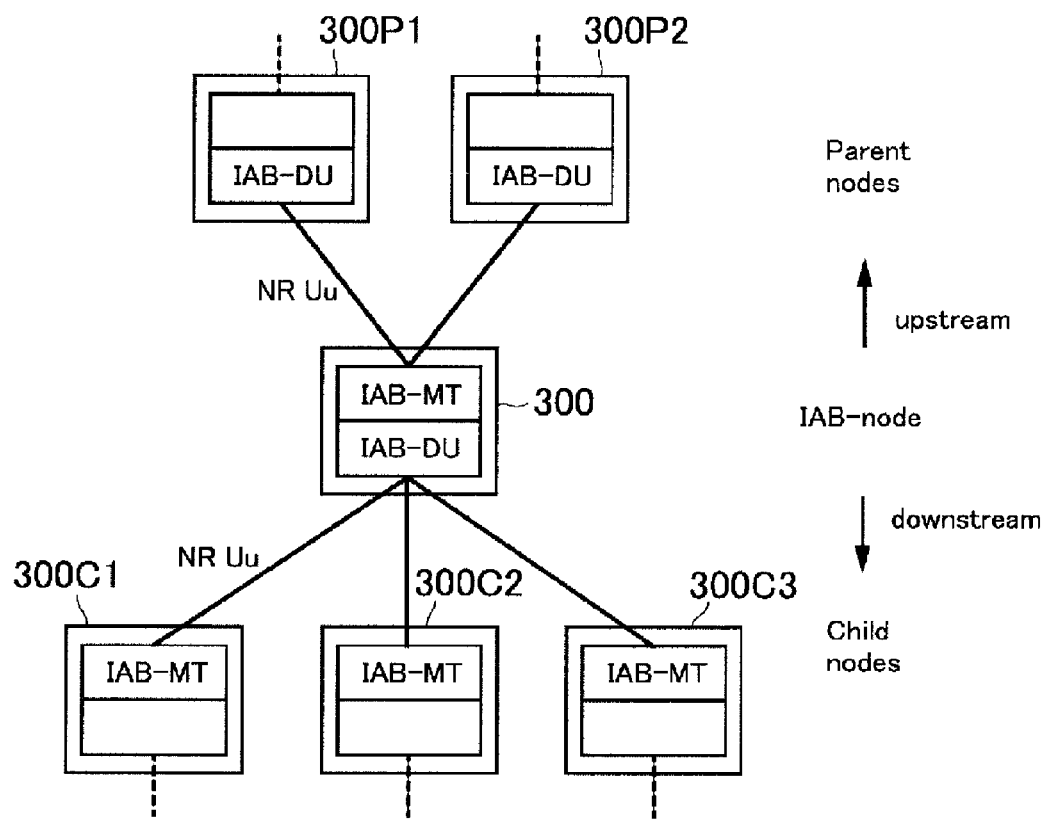
FIG. 2 is a diagram illustrating a relationship among an IAB node, parent nodes, and child nodes.

FIG. 2 is a diagram illustrating the relationship among the IAB node 300, the parent nodes, and the child nodes.

As illustrated in FIG. 2, each IAB node 300 includes an IAB-DU corresponding to a base station functioner and an IAB-Mobile Termination (MT) corresponding to a user equipment functioner.

Neighboring nodes on an NR Uu wireless interface of the IAB-MT (i.e., upper nodes) may be referred to as "parent nodes". The parent node is the DU of a parent IAB node or a donor gNB 200. A radio link between the IAB-MT and each parent node is referred to as a backhaul link. In FIG. 2, an example in which the parent nodes of the IAB node 300 are IAB nodes 300P1 and 300P2 is illustrated. Note that the direction toward the parent nodes is referred to as upstream.

Neighboring nodes on an NR access interface of the IAB-DU (i.e., lower nodes) may be referred to as "child nodes". The IAB-DU manages cells in a manner same as, and/or similar to the gNB 200. The IAB-DU terminates the NR Uu wireless interface to the UE 100 and the lower IAB nodes. The IAB-DU supports the F1 protocol for the CU of the donor gNB 200-1. In FIG. 2, an example in which the child nodes of the IAB node 300 are IAB nodes 300C1 to 300C3 is illustrated. Note that the direction toward the child nodes is referred to as downstream.

Configuration of Base Station

Figure 3:
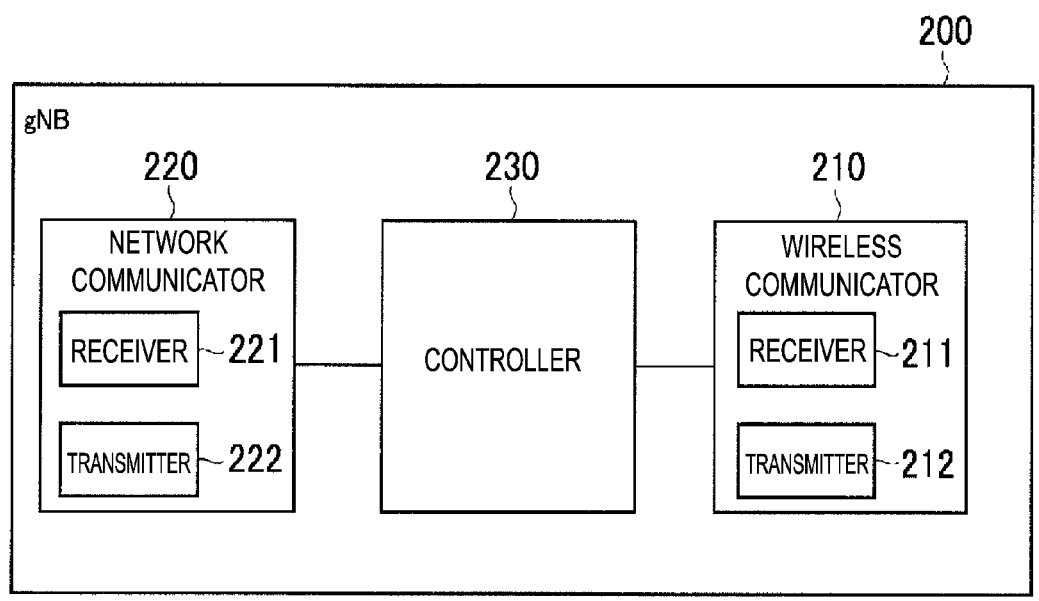
FIG. 3 is a diagram illustrating a configuration of a base station (gNB) according to an embodiment.

A configuration of the gNB 200, corresponding to a base station according to an embodiment, will be described. FIG. 3 is a diagram illustrating a configuration of the gNB 200. As illustrated in FIG. 3, the gNB 200 includes a wireless communicator 210, a network communicator 220, and a controller 230.

The wireless communicator 210 performs wireless communication with the UE 100 and performs wireless communication with the IAB node 300. The wireless communicator 210 includes a receiver 211 and a transmitter 212. The receiver 211 performs various types of receptions under control of the controller 230. The receiver 211 includes an antenna, and converts a radio signal received by the antenna into a baseband signal (received signal) and outputs the baseband signal to the controller 230. The transmitter 212 performs various types of transmissions under control of the controller 230. The transmitter 212 includes an antenna, and converts a baseband signal (transmission signal) to be output by the controller 230 into a radio signal and transmits the radio signal from the antenna.

The network communicator 220 performs wired communication (or wireless communication) with the 5GC 10 and performs wired communication (or wireless communication) with another neighboring gNB 200. The network communicator 220 includes a receiver 221 and a transmitter 222. The receiver 221 performs various types of receptions under control of the controller 230. The receiver 221 receives a signal from the outside and outputs the received signal to the controller 230. The transmitter 222 performs various types of transmissions under control of the controller 230. The transmitter 222 transmits a transmission signal output by the controller 230 to the outside.

The controller 230 performs various types of controls for the gNB 200. The controller 230 includes at least one memory and at least one processor electrically connected to the memory. The memory stores programs to be executed by the processor and information to be used for processes by the processor. The processor may include a baseband processor and a Central Processing Unit (CPU). The baseband processor performs modulation and demodulation, and coding and decoding of a baseband signal, and the like. The CPU executes the programs stored in the memory to perform various types of processes. The processor performs processing of the layers described below.

Configuration of Relay Node

Figure 4:
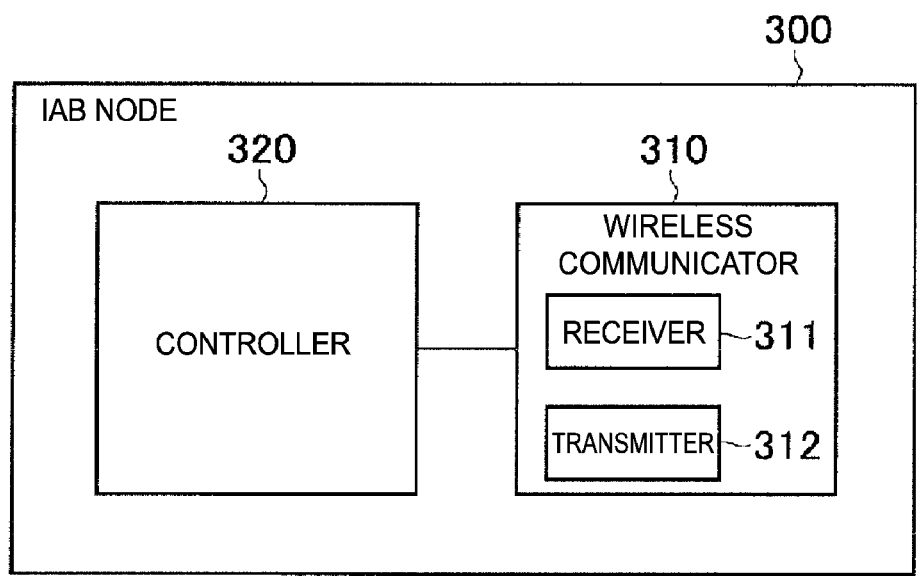
FIG. 4 is a diagram illustrating a configuration of a relay node (IAB node) according to an embodiment.

A configuration of the IAB node 300 that is a relay node according to an embodiment will be described. FIG. 4 is a diagram illustrating a configuration of the IAB node 300. As illustrated in FIG. 4, the IAB node 300 includes a wireless communicator 310 and a controller 320. The IAB node 300 may include a plurality of wireless communicators 310.

The wireless communicator 310 performs wireless communication (BH link) with the gNB 200 and performs wireless communication (access link) with the UE 100. The wireless communicator 310 for the BH link communication and the wireless communicator 310 for the access link communication may be provided separately.

The wireless communicator 310 includes a receiver 311 and a transmitter 312. The receiver 311 performs various types of receptions under control of the controller 320. The receiver 311 includes an antenna, and converts a radio signal received by the antenna into a baseband signal (received signal) and outputs the baseband signal to the controller 320. The transmitter 312 performs various types of transmissions under control of the controller 320. The transmitter 312 includes an antenna, and converts a baseband signal (transmission signal) to be output by the controller 320 into a radio signal and transmits the radio signal from the antenna.

The controller 320 performs various types of controls in the IAB node 300. The controller 320 includes at least one memory and at least one processor electrically connected to the memory. The memory stores programs to be executed by the processor and information to be used for processes by the processor. The processor may include a baseband processor and a CPU. The baseband processor performs modulation and demodulation, and coding and decoding of a baseband signal, and the like. The CPU executes the programs stored in the memory to perform various types of processes. The processor performs processing of the layers described below.

Figure 5:
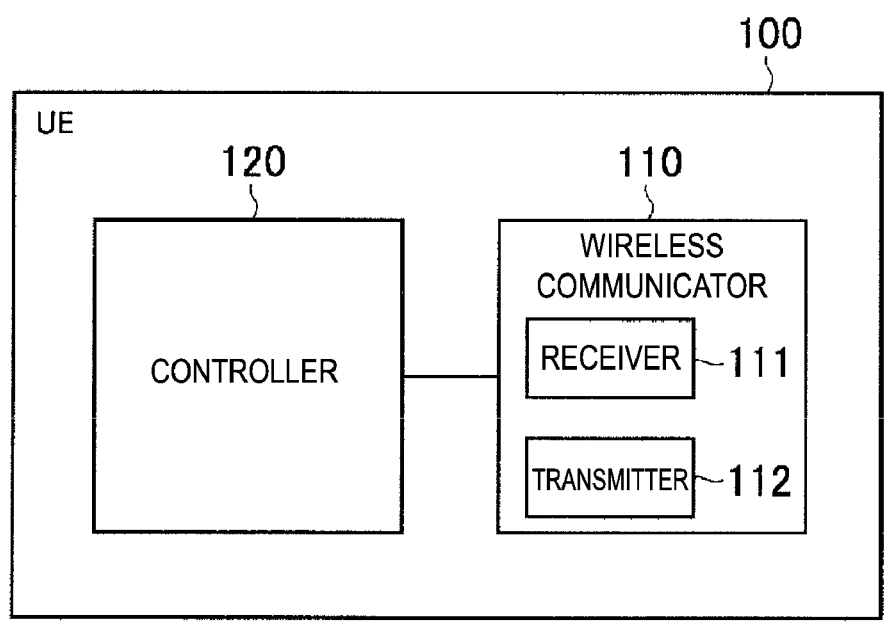
FIG. 5 is a diagram illustrating a configuration of user equipment (UE) according to an embodiment.

Configuration of User Equipment A configuration of the UE 100, corresponding to user equipment according to an embodiment, will be described. FIG. 5 is a diagram illustrating a configuration of the UE 100. As illustrated in FIG. 5, the UE 100 includes a wireless communicator 110 and a controller 120.

The wireless communicator 110 performs wireless communication in the access link, specifically, wireless communication with the gNB 200 and wireless communication with the IAB node 300. The wireless communicator 110 may perform wireless communication in the sidelink, that is, wireless communication with another UE 100. The wireless communicator 110 includes a receiver 111 and a transmitter 112. The receiver 111 performs various types of receptions under control of the controller 120. The receiver 111 includes an antenna, and converts a radio signal received by the antenna into a baseband signal (received signal) and outputs the baseband signal to the controller 120. The transmitter 112 performs various types of transmissions under control of the controller 120. The transmitter 112 includes an antenna, and converts a baseband signal (transmission signal) to be output by the controller 120 into a radio signal and transmits the radio signal from the antenna.

The controller 120 performs various types of controls for the UE 100. The controller 120 includes at least one memory and at least one processor electrically connected to the memory. The memory stores programs to be executed by the processor and information to be used for processes by the processor. The processor may include a baseband processor and a CPU. The baseband processor performs modulation and demodulation, and coding and decoding of a baseband signal, and the like. The CPU executes the programs stored in the memory to perform various types of processes. The processor performs processing of the layers described below.

Configuration of Protocol Stack

Figure 6:
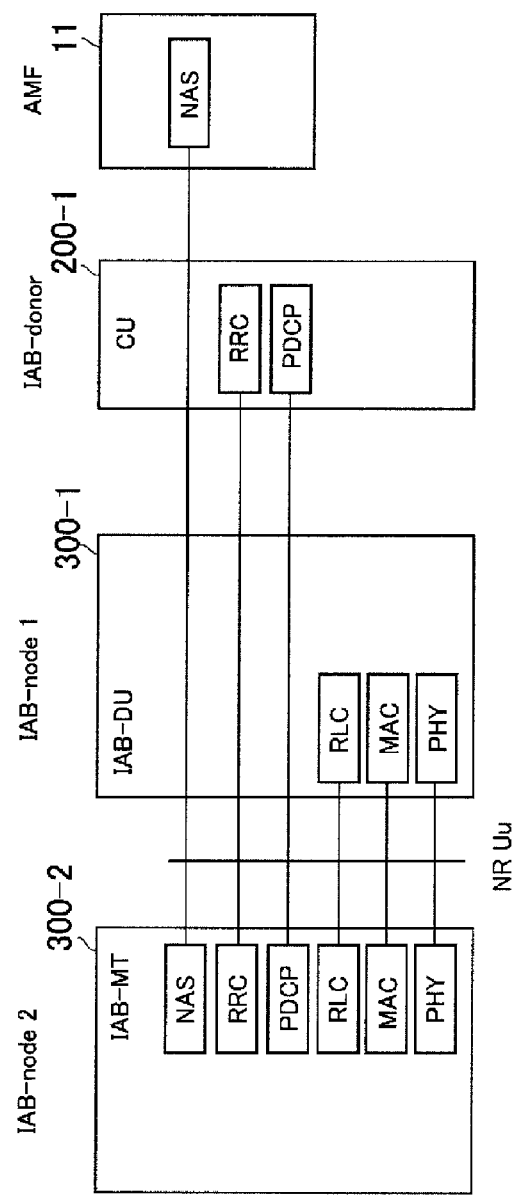
FIG. 6 is a diagram illustrating an example of a protocol stack related to an RRC connection and an NAS connection of an IAB-MT.

A configuration of the protocol stack according to an embodiment will be described. FIG. 6 is a diagram illustrating an example of a protocol stack related to an RRC connection and an NAS connection of the IAB-MT.

As illustrated in FIG. 6, the IAB-MT of the IAB node 300-2 includes a physical (PHY) layer, a Medium Access Control (MAC) layer, a Radio Link Control (RLC) layer, a Packet Data Convergence Protocol (PDCP) layer, a Radio Resource Control (RRC) layer, and a Non-Access Stratum (NAS) layer.

The PHY layer performs coding and decoding, modulation and demodulation, antenna mapping and demapping, and resource mapping and demapping. Data and control information are transmitted between the PHY layer of the IAB-MT of the IAB node 300-2 and the PHY layer of the IAB-DU of the IAB node 300-1 via a physical channel.

The MAC layer performs priority control of data, a retransmission process through a hybrid ARQ (HARQ), a random access procedure, and the like. Data and control information are transmitted between the MAC layer of the IAB-MT of the IAB node 300-2 and the MAC layer of the IAB-DU of the IAB node 300-1 via a transport channel. The MAC layer of the IAB-DU includes a scheduler. The scheduler determines transport formats (transport block sizes, modulation and coding schemes (MCSs)) in the uplink and the downlink and resource blocks to be allocated.

The RLC layer transmits data to the RLC layer on the reception side by using functions of the MAC layer and the PHY layer. Data and control information are transmitted between the RLC layer of the IAB-MT of the IAB node 300-2 and the RLC layer of the IAB-DU of the IAB node 300-1 via a logical channel.

The PDCP layer performs header compression and decompression, and encryption and decryption. Data and control information are transmitted between the PDCP layer of the IAB-MT of the IAB node 300-2 and the PDCP layer of the donor gNB 200-1 via a radio bearer.

The RRC layer controls a logical channel, a transport channel, and a physical channel according to establishment, reestablishment, and release of a radio bearer. RRC signaling for various configurations is transmitted between the RRC layer of the IAB-MT of the IAB node 300-2 and the RRC layer of the donor gNB 200-1. An RRC connection to the donor gNB 200-1 sets the IAB-MT in an RRC connected state. The lack of an RRC connection to the donor gNB 200-1 sets the IAB-MT in an RRC idle state.

The NAS layer higher than the RRC layer performs session management, mobility management, and the like. NAS signaling is transmitted between the NAS layer of the IAB-MT of the IAB node 300-2 and the AMF 11 of the NAS layer.

Figure 7:
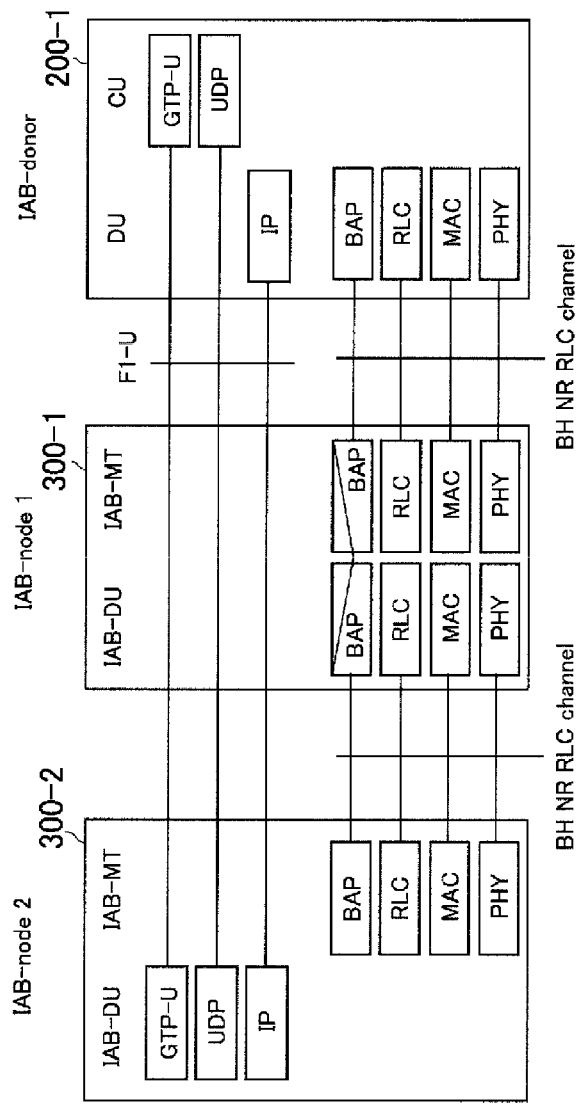
FIG. 7 is a diagram illustrating a protocol stack related to an F1-U protocol.
Figure 8:
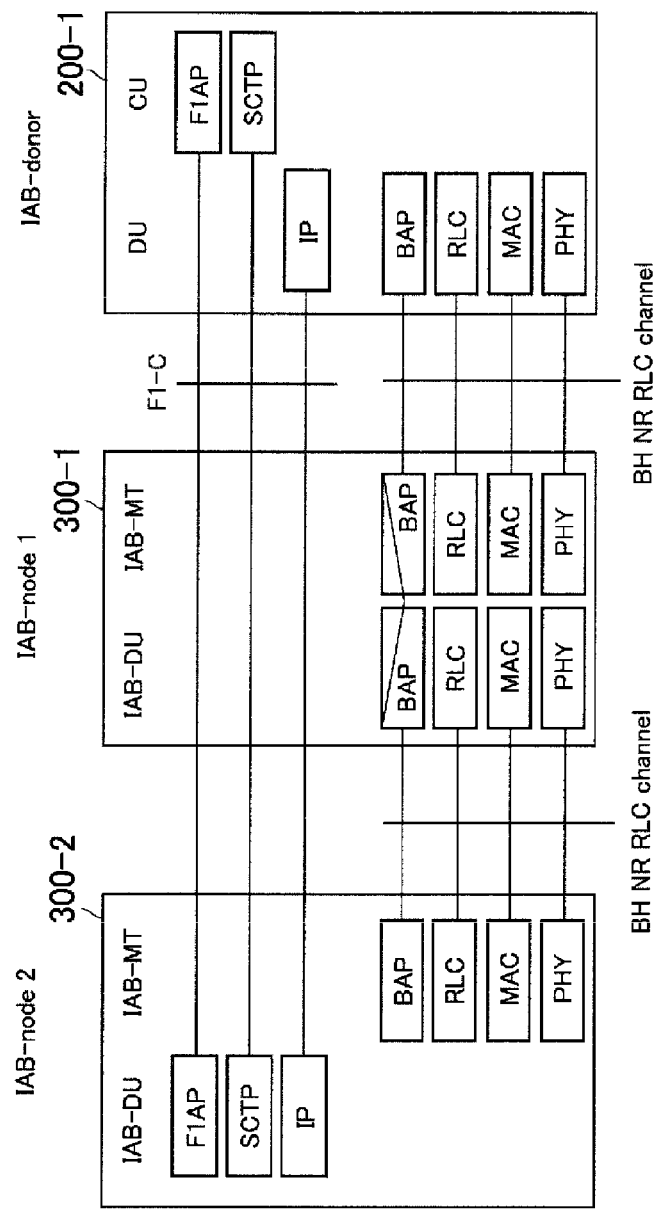
FIG. 8 is a diagram illustrating a protocol stack related to the F1-C protocol.

FIG. 7 is a diagram illustrating an example of a protocol stack for the F1-U protocol. FIG. 8 is a diagram illustrating an example of a protocol stack for the F1-C protocol. Here, an example in which the donor gNB 200-1 is divided into the CU and the DU is illustrated.

As illustrated in FIG. 7, each of the IAB-MT of the IAB node 300-2, the IAB-DU of the IAB node 300-1, the IAB-MT of the IAB node 300-1, and the DU of the donor gNB 200-1 includes a Backhaul Adaptation Protocol (BAP) layer as an upper layer of the RLC layer. The BAP layer is a layer that performs routing processing and bearer mapping and demapping processing. In the backhaul, the IP layer is transmitted via the BAP layer to allow routing through multiple hops.

In each backhaul link, Protocol Data Units (PDUs) of the BAP layer are transmitted by the backhaul RLC channel (BH NR RLC channel). Configuring multiple backhaul RLC channels in each BH link enables the prioritization and QoS control of traffic. The association between the BAP PDU and the backhaul RLC channel is performed by the BAP layer of each IAB node 300 and the BAP layer of the donor gNB 200-1.

As illustrated in FIG. 8, the protocol stack of the F1-C protocol includes an F1 AP layer and an SCTP layer instead of a GTP—U layer and a UDP layer illustrated in FIG. 7.

Failure Occurrence Notification

Figure 9:
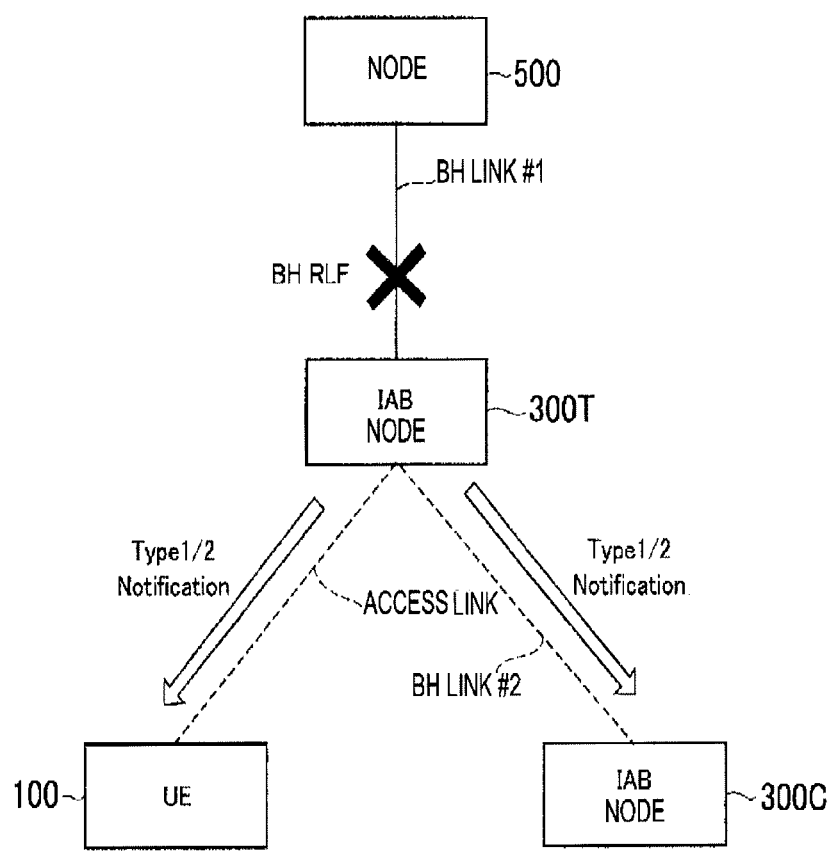
FIG. 9 is a diagram illustrating operations related to a failure-related notification according to an embodiment.

A failure-related notification according to an embodiment will be described. FIG. 9 is a diagram illustrating operations related to a failure-related notification according to an embodiment.

As illustrated in FIG. 9, an IAB node 300T, a node 500, an IAB node 300C, and UE 100 are present. The node 500 is a parent node of the IAB node 300T, and is the gNB 200 (donor node) or the IAB node 300 (parent IAB node). The IAB-MT of the IAB node 300T has established a backhaul link (BH link) #1 with the node 500. The IAB-MT of the IAB node 300T is in the RRC connected state.

The IAB node 300C is a child node (slave IAB node) of the IAB node 300T. The IAB-MT of the IAB node 300C has established a BH link #2 with the IAB node 300T. The IAB-MT of the IAB node 300C is in the RRC connected state. The IAB-MT of the IAB node 300C need not have established a BH link #2 with the IAB node 300T, and may be in the RRC idle state.

The UE 100 includes an established access link with the IAB node 300T. The UE 100 is in the RRC connected state. The UE 100 need not have established an access link with the IAB node 300T, and may be in the RRC idle state.

In such a scenario, it is assumed that the IAB-MT of the IAB node 300T detects a radio link failure (BH RLF) in the BH link #1. The IAB-MT of the IAB node 300T detects the BH RLF, for example, as follows, and performs a recovery attempt to recover from the BH RLF.

First, when detecting an out-of-sync state N310 consecutive times, the IAB-MT of the IAB node 300T detects a radio problem and starts a timer T310. When detecting an in-sync state N311 consecutive times after starting the timer T310, the IAB-MT of the IAB node 300T stops the timer T310.

Second, when the timer T310 is not stopped and expires, the IAB-MT of the IAB node 300T detects an RLF and starts a timer T311 (i.e., starts RRC reestablishment processing), and performs cell selection processing in order to recover the BH link. When selecting an appropriate cell by the cell selection processing and recovering the BH link for the selected cell, the IAB-MT of the IAB node 300T stops the timer T311. The appropriate cell refers to a cell that meets at least minimum wireless quality criteria.

Third, when the recovery of the BH link is unsuccessful and the timer T311 expires, the IAB-MT of the IAB node 300T transitions to the RRC idle state. Failed recovery from a BH RLF after detection of the BH RLF (i.e., expiration of the timer T311) may be hereinafter referred to as failed recovery of BH link.

Note that even when the IAB-MT of the IAB node 300T detects a BH RLF in the BH link #1, the radio state of the BH link #2 and the radio state of the access link may be good. Accordingly, the IAB node 300C and the UE 100 may remain in the cell of the IAB node 300T having detected the BH RLF.

The IAB node 300T transmits, to a downstream communication apparatus, a failure occurrence notification indicating the occurrence of a BH RLF between the IAB node 300T and the node 500. Here, the downstream communication apparatus is at least one of the IAB node 300C and the UE 100.

The failure occurrence notification may be a notification indicating that a BH RLF has been detected. Such a failure occurrence notification is hereinafter referred to as a Type 1 Notification (RLF detected).

The failure occurrence notification may be a notification indicating that recovery from the BH RLF is being attempted. Such a failure occurrence notification is hereinafter referred to as a Type 2 Notification (Trying to recover). The Type 1 Notification and the Type 2 Notification are referred to as a Type 1/2 Notification when the notifications are not distinguished from each other.

The Type 1/2 Notification may be included in a message of the BAP layer, for example, a BAP Control Protocol Data Unit (PDU). The IAB node 300C already connected to the IAB node 300T can receive, from the IAB node 300T, the Type 1/2 Notification included in the message of the BAP layer. On the other hand, the UE 100 includes no BAP layer and thus fails to receive the Type 1/2 Notification included in the message of the BAP layer.

Thus, the IAB-DU of the IAB node 300T includes and transmits the Type 1/2 Notification in the system information block type 1 (SIB1). This allows not only the IAB node 300C but also the UE 100 to receive the Type 1/2 Notification.

SIB1 is an example of system information (system information block). SIB1 includes information defining the scheduling of other system information blocks and required for initial access. SIB1 is broadcast periodically on a downlink shared channel (DL-SCH).

The IAB-MT of the IAB node 300C and the UE 100 each start a timer (hereinafter referred to as "recovery failure determination timer") that determines the time to wait for recovery from the BH RLF in response to receiving the Type 1/2 Notification. In this manner, by notifying the Type 1/2 Notification in SIB1 and determining a failure in recovery from a BH RLF at the parent node (IAB node 300T) using the recovery failure determination timer, the behaviors of the IAB-MT and the UE 100 can be the same. When the recovery failure determination timer expires, the IAB-MT of the IAB node 300C and the UE 100 each start an operation for switching from the IAB node 300T to another node.

Figure 10:
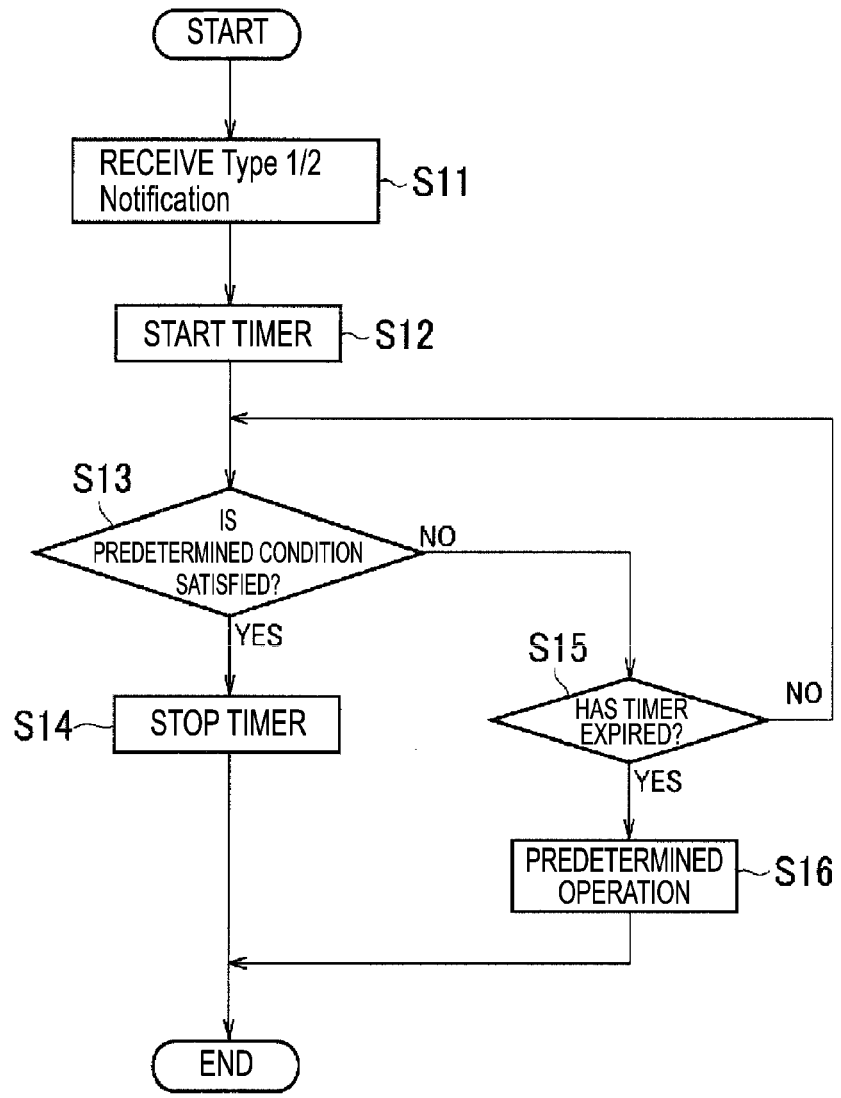
FIG. 10 is a diagram illustrating operations of the IAB-MT of the IAB node and the UE related to a failure-related notification according to an embodiment.

FIG. 10 is a diagram illustrating operations of IAB-MT of the IAB node 300C and the UE 100 related to the failure-related notification according to an embodiment. The IAB-MT of the IAB node 300C and the UE 100 are simply referred to as a "communication apparatus" when the IAB-MT and the UE 100 are not distinguished from each other.

As illustrated in FIG. 10, in step S11, the communication apparatus receives, from the IAB-DU of the IAB node 300T, SIB1 including the Type 1/2 Notification. Note that the IAB-DU of the IAB node 300T includes the Type 1/2 Notification in SIB1 periodically transmitted when the IAB-MT of the IAB node 300T detects a BH RLF or starts a recovery operation.

However, the BAP layer of the IAB node 300T may transmit the BAP Control PDU (or MAC Control Element) including the Type 1/2 Notification when the IAB-MT of the IAB node 300T detects a BH RLF or starts the recovery operation.

In step S12, the communication apparatus starts the recovery failure determination timer in response to receiving the Type 1/2 Notification. The timer value of the recovery failure determination timer may be a predetermined fixed value, or may be a variable value configured for the communication apparatus by the IAB node 300T by using an SIB or the like, or may be a variable value configured for the communication apparatus by the donor node by using unicast signaling (RRC Reconfiguration message or the like). Note that the value of the recovery failure determination timer may be equal to or less than the total value of a timer T311 of (timer for cell selection) and a timer T301 (timer for RRC reestablishment) of the IAB-MT of the IAB node 300T.

The communication apparatus may continue to monitor the Type 1/2 Notification (SIB1) when the recovery failure determination timer is running. The communication apparatus may stop uplink transmission when the recovery failure determination timer is running.

In step S13, the communication apparatus determines whether a predetermined condition for stopping the recovery failure determination timer is satisfied. The predetermined condition is one of the following conditions 1 to 5 or a combination of two or more of the following conditions 1 to 5.

Condition 1: Repeated transmission of SIB1 including the Type 1/2 Notification has stopped. In other words, condition 1 is that the communication apparatus has not received SIB1 including the Type1/2 Notification for a certain period of time. When detecting stoppage of repeated reception of SIB1 including the Type 1/2 Notification, the communication apparatus determines that condition 1 is satisfied.

Condition 2: Type 3 Notification (RLF recovered) is received from the IAB node 300T. The Type 3 Notification is a recovery notification indicating that IAB node 300T has recovered from the BH RLF. The Type 3 Notification may be transmitted from the IAB node 300T by using the BAP Control PDU, or may be transmitted from the IAB node 300T by using SIB 1. Note that when the Type 3 Notification is transmitted from the IAB node 300T by using the BAP Control PDU, the IAB node 300C can receive the Type 3 Notification, whereas the UE 100 fails to receive the Type 3 Notification. By receiving the BAP Control PDU including the Type 3 Notification, the IAB node 300C can quickly recognize that the IAB node 300T has recovered from the BH RLF. This allows the IAB node 300C, which is a type of network node, to be treated more advantageously than the UE 100.

Condition 3: a Type 4 Notification (Recovery failure) is received from the IAB node 300T. The Type 4 Notification is a recovery failure notification indicating that IAB node 300T has failed to recover from the BH RLF. The Type 4 Notification may be transmitted from the IAB node 300T by using the BAP Control PDU, or may be transmitted from the IAB node 300T by using SIB1. When receiving the Type 4 Notification, the communication apparatus stops the recovery failure determination timer and considers that an RLF has occurred, and starts RRC reestablishment processing for recovering from the RLF. Note that when the Type 4 Notification is transmitted from the IAB node 300T by using the BAP Control PDU, the IAB node 300C can receive the Type 4 Notification, whereas the UE 100 fails to receive the Type 4 Notification. By receiving the BAP Control PDU including the Type 4 Notification, the IAB node 300C can quickly recognize that the IAB node 300T has failed to recover from the BH RLF. This allows the IAB node 300C, which is a type of network node, to be treated more advantageously than the UE 100.

Condition 4: The communication apparatus has re-selected a cell (RRC idle state) or has performed handover (RRC connected state). In other words, condition 4 is that the communication apparatus has switched from the cell of the IAB node 300T having detected the BH RLF to another cell. Note that the handover may include conditional handover described below.

Condition 5: The communication apparatus has detected an RLF. Condition 5 is that a failure has occurred in the link of the communication apparatus (the BH link #2 illustrated in FIG. 9 or the access link). In this case, the communication apparatus starts the RRC reestablishment processing for recovering from the RLF.

In step S13, if a predetermined condition is determined to be satisfied (step S13: YES), the communication apparatus stops the recovery failure determination timer in step S14.

On the other hand, in step S13, if the predetermined condition is determined not to be satisfied (step S13: NO), the communication apparatus determines whether the recovery failure determination timer has expired in step S15. If the recovery failure determination timer is determined not to have expired (step S15: NO), the processing returns to step S13.

If the recovery failure determination timer is determined to have expired (step S15: YES), then in step S16, the communication apparatus starts a predetermined operation for switching from the IAB node 300T to another node. The predetermined operation is one of the following operations 1 to 4 or a combination of two or more of the following operations 1 to 4.

Operation 1: Consider that an RLF has occurred (when the communication apparatus is in the RRC connected state). Specifically, the communication apparatus in the RRC connected state determines that the IAB node 300T has failed to recover from the BH RLF even though the link (BH link #2 or the access link) between the communication apparatus and the IAB node 300T is normal, and considers that an RLF has occurred in the communication apparatus.

Operation 2: Trigger RRC reestablishment (when the communication apparatus is in the RRC connected state). Operation 2 may be performed after Operation 1.

Operation 3: Trigger cell re-selection (when the communication apparatus is in the RRC idle state). In other words, the communication apparatus in the RRC idle state re-selects, instead of the cell (serving cell) of the IAB node 300T, another cell when the recovery failure determination timer expires.

Operation 4: Trigger conditional handover (when the communication apparatus is in the RRC connected state). Details of the conditional handover will be described below.

Note that in Operation 2, the communication apparatus in the RRC connected state performs cell selection processing for selecting the cell of the RRC reestablishment destination. In Operation 3, the communication apparatus in the RRC idle state performs cell re-selection processing. In the cell selection processing and cell re-selection processing, the communication apparatus typically selects a cell in a good radio state (e.g., a cell in which reference signal received power measured is high).

Thus, in the cell selection processing of Operation 2 and the cell re-selection processing of Operation 3, the communication apparatus may exclude, from selection candidates, the cell of the IAB node 300T corresponding to the original serving cell. For example, the communication apparatus may exclude the cell of the IAB node 300T from the selection candidates over a certain period of time (e.g., 300 seconds or the like). The communication apparatus may exclude the cell of the IAB node 300T from the selection candidates only in the first cell selection processing or cell re-selection processing after the expiration of the recovery failure determination timer. The communication apparatus may add a negative infinity offset or a sufficiently large negative offset (−200 dB or the like) to the measured value of the radio state (e.g., reference signal received power) in the cell of the IAB node 300T to avoid the selection of the cell of the IAB node 300T.

Conditional Handover
The conditional handover according to an embodiment will be described.

In the scenario as illustrated in FIG. 9, it is assumed that the IAB-MT of the IAB node 300C is in the RRC connected state, and the conditional handover is configured for the IAB-MT of the IAB node 300C. The configuration of the conditional handover includes a candidate cell for handover and a handover trigger condition. The configuration of the conditional handover may include pluralities of combinations of a candidate cell and a trigger condition. The configuration of the conditional handover further includes an RRC configuration corresponding to the candidate cell.

In a typical handover, the UE 100 reports, to the gNB 200, the measured value of the radio state of the serving cell and/or a neighbor cell, and based on this report, the gNB 200 determines the handover to the neighbor cell and transmits a handover indication to the UE 100. Accordingly, when the radio state of the serving cell is rapidly degraded, in the typical handover, communication breakdown may occur before the handover is performed. In contrast, in the conditional handover, when a preconfigured trigger condition is satisfied, a handover to the candidate cell corresponding to the trigger condition can autonomously be performed. Accordingly, the problem with the typical handover can be solved.

As the trigger condition, for example, at least one of an event referred to as an event A3 and an event referred to as event A5 is specified. The event A3 is an event where the radio state of the neighbor cell is better than the radio state of the serving cell by a predetermined amount (predetermined offset) or more. The event A5 is an event where the radio state of the serving cell is worse than a first threshold, and the radio state of the neighbor cell is better than a second threshold.

(1) Operation Pattern 1
Operation Pattern 1 of the IAB node 300C configured with the conditional handover will be described.

In Operation Pattern 1, the IAB node 300C configured with the conditional handover receives, from the IAB node 300T corresponding to a parent node, a notification based on a BH RLF in the BH link #1 between the IAB node 300T and the node 500. The notification based on the BH RLF may be the Type 1/2 Notification or the Type 4 Notification described above. The IAB node 300C performs processing for forcibly triggering the conditional handover based on the notification. Thus, when the IAB node 300T has detected the BH RLF, the handover to the candidate cell for the conditional handover can be more reliably started, reducing the possibility of communication breakdown and the breakdown time.

Figure 11:
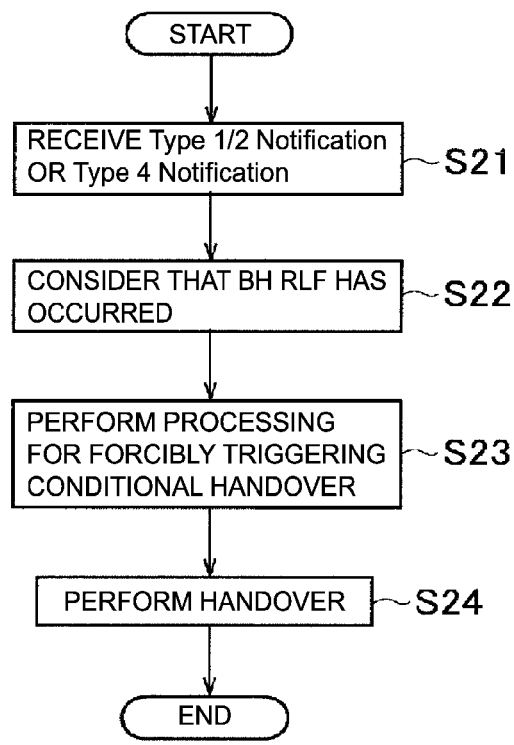
FIG. 11 is a diagram illustrating Operation Pattern 1 of the IAB node related to a conditional handover according to an embodiment.

FIG. 11 is a diagram illustrating Operational Pattern 1 of IAB node 300C related to the conditional handover according to an embodiment.

As illustrated in FIG. 11, in step S21, the IAB-MT (or the BAP layer) of the IAB node 300C receives the Type 1/2 Notification or the Type 4 Notification from the IAB node 300T. When receiving the Type 1/2 Notification from the IAB node 300T, the IAB-MT of the IAB node 300C starts the recovery failure determination timer described above. Here, the description blow assumes that the recovery failure determination timer has expired.

In step S22, in response to expiry of the recovery failure determination timer or reception of the Type 4 Notification from the IAB node 300T, the IAB-MT of the IAB node 300C considers that an RLF (BH RLF) has occurred in the IAB node 300C.

In step S23, the IAB-MT of the IAB node 300C performs processing for forcibly triggering the configured conditional handover. Such processing is either first processing or second processing described below.

First Processing:
In the first processing, the IAB-MT of the IAB node 300C controls at least one of the measured value of the radio state and an offset value added to the measured value to satisfy the trigger condition for the conditional handover. While performing such control, the IAB-MT of the IAB node 300C evaluates the trigger condition for the conditional handover.

For example, the IAB-MT of the IAB node 300C may add a negative infinity offset or a sufficiently large negative offset (−200 dB or the like) to the measured value (for example, reference signal received power) of the radio state of the serving cell (cell of the IAB node 300 T) to make the measured value equal to zero. Thus, in the evaluation of the trigger condition, the trigger condition is evaluated to be satisfied and the handover can forcibly be triggered. Such processing may be applied only when the event A5 described above occurs. When the event A5 occurs, the evaluation may be performed with the assumption that the radio state of the serving cell has become worse than the first threshold. In other words, the only determination criterion is whether the radio state of the neighbor cell is better than the second threshold. For the event A3 described above, a positive offset may be added to the measured value of the radio state of the candidate cell, and/or a negative offset may be added to the measured value of the radio state of the serving cell to make the measured value of the radio state of the candidate cell relatively higher than the measured value of the radio state of the serving cell.

When the first processing result indicates the presence of a plurality of candidate cells corresponding to the trigger condition satisfied, the IAB-MT of the IAB node 300C selects one from among the plurality of candidate cells, and performs the handover to the selected candidate cell (step S24).

In the first processing, the value of the offset may be a predetermined fixed value, may be a variable value configured for the IAB node 300C by the IAB node 300T by using the SIB or the like, or may be a variable value configured for the IAB node 300C by the donor node by using unicast signaling (RRC Reconfiguration message or the like).

Second Processing:
In the second processing, the IAB-MT of the IAB node 300C omits the evaluation of the trigger condition in the conditional handover, and considers that the trigger condition is satisfied for the candidate cell. For example, the IAB-MT of the IAB node 300C skips the evaluation of the trigger condition to forcibly trigger the conditional handover, and considers that the trigger condition is satisfied for all the configured candidate cells.

The IAB-MT of the IAB node 300C may consider that among all of the configured candidate cells, the trigger condition is satisfied for only cells that satisfy the minimum required radio quality criterion (S-criterion). The IAB-MT of the IAB node 300C may consider that among all of the configured candidate cells, the trigger condition is satisfied for only the candidate cells for which the event A3 is specified or only the candidate cells for which the event A5 is specified.

As a result of the second processing, when a plurality of candidate cells for which the trigger condition is satisfied are present, the IAB-MT of the IAB node 300C selects one from among the plurality of candidate cells, and performs the handover on the selected candidate cell (step S24).

(2) Operation Pattern 2

Operation Pattern 2 of the IAB node 300C configured with the conditional handover is described.

In Operation Pattern 2, the IAB node 300C configured with the conditional handover receives, from the IAB node 300T corresponding to a parent node, the Type 1/2 Notification (failure occurrence notification) indicating the occurrence of a BH RLF in the backhaul link #1 of the IAB node 300T.

The IAB node 300C evaluates the trigger condition for the conditional handover based on the Type 1/2 Notification even without receiving, from the IAB node 300T, the Type 4 Notification (recovery failure notification) indicating failed recovery from the BH RLF. This enables the conditional handover to be triggered earlier, reducing the possibility of communication breakdown and the breakdown time.

Figure 12:
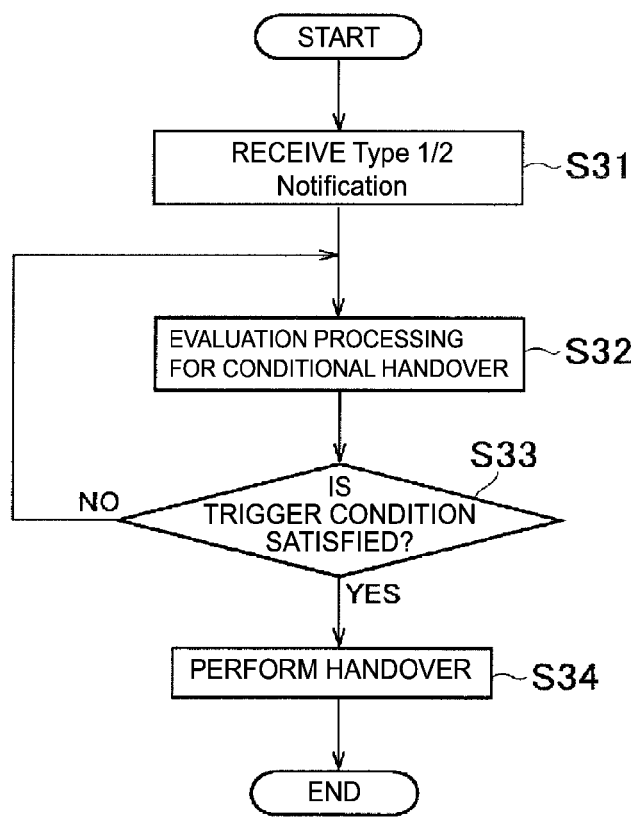
FIG. 12 is a diagram illustrating Operation Pattern 2 of the IAB node related to a conditional handover according to an embodiment.

FIG. 12 is a diagram illustrating Operation Pattern 2 of IAB node 300C related to the conditional handover according to an embodiment.

As illustrated in FIG. 12, in step S31, the IAB-MT (or the BAP layer) of the IAB node 300C receives the Type 1/2 Notification from the IAB node 300T.

In step S32, the IAB-MT of the IAB node 300C evaluates the trigger condition for the conditional handover. Here, in contrast to the flowchart in FIG. 11, the IAB-MT of the IAB node 300C may evaluate the trigger condition for the conditional handover without considering that a BH RLF has occurred.

In Operation Pattern 2, the trigger condition may include the condition that the Type 1/2 Notification has been received from the IAB node 300T a predetermined number of times or more within a predetermined time. For example, when the Type 1/2 Notification is transmitted in SIB1 that is periodically broadcast, the IAB-MT of the IAB node 300C evaluates that the trigger condition is satisfied when receiving the Type 1/2 Notification a predetermined number of times or more within a predetermined time. The IAB-MT of the IAB node 300C may evaluate that the trigger condition is satisfied when the Type 1/2 Notification is simply received once.

In Operation Pattern 2, the IAB node 300T may include, in the Type 1/2 Notification, the measured value of the radio state (BH radio quality) of the BH link #1, and transmit the Type 1/2 Notification. The IAB-MT of the IAB node 300C may evaluate the trigger condition by using the measured value included in the Type 1/2 Notification. The trigger condition may be a condition that the BH radio quality of the IAB node 300T is below the threshold. Note that the BH radio quality may be at least one of the reference signal received power (RSRP), reference signal reception quality (RSRQ), and a signal-to-interference noise ratio (SINR), or these values may be quantized (for example, Good/Normal/Bad or the like).

The trigger condition may include the event A3 and/or the event A5 described above. In this case, a method which is the same as, and/or similar to, the first processing of Operation Pattern 1 is applicable. In the evaluation of the event A3 and/or the event A5, the IAB-MT of the IAB node 300C may evaluate the event A3 and/or the event A5 using the radio state (BH radio quality) of the BH link #1 as described above instead of the radio quality of the serving cell.

When as a result of the evaluation in step S32, the trigger condition is evaluated to be satisfied (step S33: YES), in step S34, the IAB-MT of the IAB node 300C performs the handover to the candidate cell for which the trigger condition is satisfied. When a plurality of candidate cells for which the trigger condition is satisfied are present, the IAB-MT of the IAB node 300C selects one from among the plurality of candidate cells, and performs the handover on the selected candidate cell.

Other Embodiments

In the embodiment described above, the flows in FIGS. 11 and 12 may be implemented in combination with each other. For example, some of the steps in each of the flows in FIGS. 11 and 12 may be applied to the other flow.

In the embodiment described above, an example has been mainly described, in which the cellular communication system 1 is a 5G cellular communication system. However, the base station in the cellular communication system 1 may be an eNB that is an LTE base station. The core network in the cellular communication system 1 may be an Evolved Packet Core (EPC). The gNB can be connected to the EPC, the eNB can be connected to the 5GC, and the gNB and the eNB may be connected via an inter-base station interface (Xn interface, X2 interface).

A program may be provided that causes a computer to execute each of the processing operations according to the embodiments and the variations described above. The program may be recorded in a computer-readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM, a DVD-ROM, or the like. A chip set may be provided that includes a memory that stores a program for executing each of the processing operations performed by the UE 100, the gNB 200, or the IAB node 300 and a processor that executes the program stored in the memory.

Supplementary Note

Introduction

A work item for Integrated Access AND Backhaul (IAB) was approved. Further agreement has been reached on the processing for a backhaul radio link failure (BH RLF) as described below.

The operation of the IAB-DU after RLF declaration is implementation dependent. The IAB-DU should transmit an RLF notification when RLF recovery fails.

High-speed MCG link recovery is supported by NRDC and ENDC.

Regarding the aspect of conditional handover (CHO), RAN2 actually held some discussions at the research stage and the work stage. For example, in section 9.7.15 of TR38.874, RAN2 has identified "preparation of an alternative backhaul link and an alternative route in advance (i.e., before an RLF occurs)" for efficient recovery from the BH RLF. This allows this mechanism to be considered the CHO. Consequently, the CHO may be configured for each IAB node for stable BH connection. RAN2 further discussed various usages of the CHO through emails, but ultimately deleted the aspect of the CHO from section 9.2.7 of the stage 2 specifications.

Supplementary Note will discuss possible CHO-specific expansion for IAB deployment.

DISCUSSION

Scenario of Radio Link Failure in IAB
In the current TS 38.300 and in the stage 2 CR of the latest IAB, a radio link failure (RLF) is declared when any of the six conditions below is satisfied.
The UE declares a radio link failure (RLF) when any of the criteria below is satisfied:
  Expiration of the radio problem timer to be started after indication of the radio problem from the physical layer (the UE stops the timer when recovery is made from the radio problem before the timer expires);
  Expiration of a timer to be started when a measurement report of a measurement ID for which the timer is configured is triggered during a time when another radio problem timer is running;
  RLC failure;
  Detection of consistent uplink LBT failures to operate in shared spectral channel access;
  For the IAB-MT, reception of BH RLF indication received from the parent node.

Figure 13:
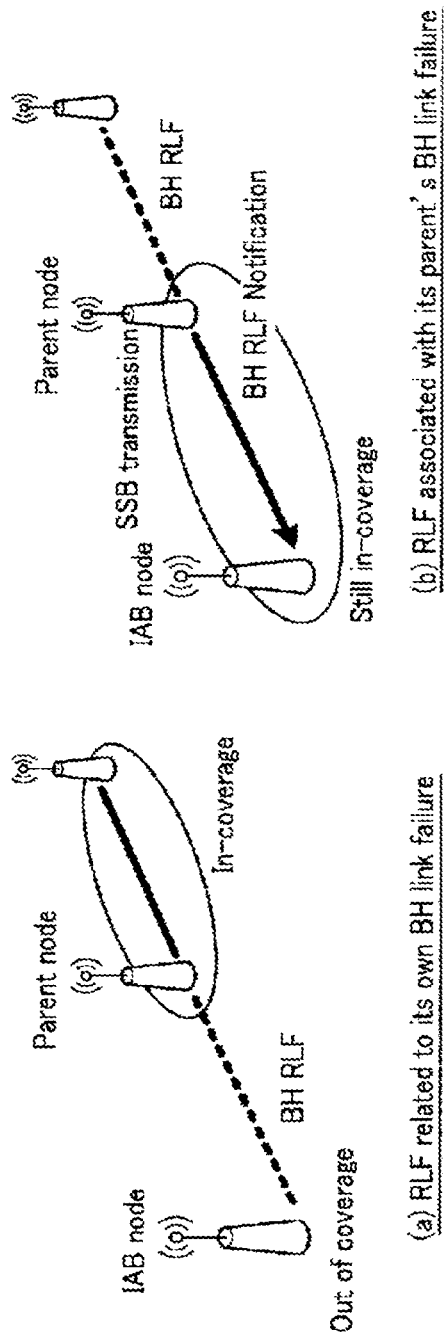
FIG. 13 is a diagram illustrating an RLF associated with a different BH link.

As illustrated in FIG. 13, in view of deployment of IAB, the first five conditions are associated with a BH link failure in the IAB-MT, and the last condition is associated with a BH link failure in the parent of the IAB MT. As the last condition, it is clear that when receiving a BH RLF notification, that is, "failed recovery" of the BH link of the parent, the IAB-MT declares an RLF even when the BH link of the IAB-MT is still good.

Observation 1: When receiving the BH RLF notification, the IAB-MT declares an RLF even when the BH link of the IAB-MT is still good.

Conditional Handover in IAB Deployment
RLF Associated with BH Link of IAB-MT
This scenario is common to normal UEs, and thus the NR mobility expansion WI has appropriately solved problems associated with CHO evaluation, CHO execution, and other operations.

Before the RLF declaration, the radio state of the BH link is typically degraded. When the trigger condition (the CHO event A3/A5 related to the CHO configuration) is satisfied, the CHO may be triggered. This is a normal scenario for triggering the CHO, and the IAB-MT can freely use the CHO.

Observation 2: When the BH link of the IAB-MT is problematic, as indicated in the current specifications, the IAB-MT can trigger the CHO when the CHO event A3/A5 is satisfied due to a poor radio state of the BH link of the IAB-MT before declaration of an RLF.

After an RLF is declared, that is, when the CHO is not yet triggered for any reason, then the UE selects a cell, and when the selected cell is a CHO candidate, the UE attempts to perform the CHO. Accordingly, the IAB-MT can use this mechanism without expansion.

In the case of the CHO, after the source cell declares an RLF, the UE performs the following:
  maintains an RRC connection;
  selects an appropriate cell, and when the selected cell is a CHO candidate, and the network configures the UE such that the UE attempts the CHO after the RLF, the UE attempts to perform the CHO once. Otherwise, reestablishment is performed;
  when no appropriate cell is found within a certain period of time since the RLF declaration, enters the RRC idle state.

Observation 3: when the selected cell is a CHO candidate as indicated in the current specifications regardless of the RLF scenario described above, the IAB-MT can attempt to perform the CHO after the RLF declaration.

The use of the CHO for IAB is not problematic, and no specification change is predicted. However, the current stage 2 text describes only the "RLF recovery using the RRC Reestablishment procedure" as follows. In other words, the text refers to none of the MCG failure information, SCG failure information, and CHO procedure.

When an RLF occurs in the IAB BH link, the same mechanism and procedure as those for the access link are applied. This includes the RLF recovery using the BH RLF detection and the RRC reestablishment procedure.

RAN2 has already agreed that "high-speed MCG link recovery is supported by NRDC and ENDC", and the new failure type "bh-RLF" is introduced into both MCG failure information and SCG failure information. As discussed above in Observations 2 and 3, the CHO can be used in IAB. The sentences, such as restriction of the RLF recovery, that may cause unwanted confusion should be removed from TS38.300.

Proposal 1: RAN2 should agree to delete the "use of the RRC reestablishment procedure" from section 9.2.7 of TS38.300 to avoid unwanted misunderstanding of the RLF recovery in IAB.

FIG. 14 illustrates an example of a specification change when Proposal 1 can be agreed on.
RLF Associated with Parent BH Link
In this scenario, the radio state is totally different. In other words, the BH link of the IAB-MT is still good, but the BH link of the parent is problematic. The IAB-MT fails to trigger the CHO before the RLF declaration, and needs to rely on the CHO attempt after the RLF declaration.

Observation 4: When the BH link of the parent is problematic, the BH link of the IAB-MT is still/constantly good and the IAB-MT is unable to trigger the CHO.

After the RLF declaration at the time of reception of the BH RLF notification ("recovery failure"), the same mechanism as that described in Observation 3 can be reused.

However, since the CHO is dependent on the cell selection procedure, the IAB-MT may omit selection of a CHO candidate cell, and this means that execution of the CHO may be omitted. The IAB-MT may select the (previous) parent node that has transmitted the BH RLF notification.

Observation 5: Even after the RLF recovery fails in the BH link of the parent, the IAB node relies on the cell selection and may thus omit the CHO execution.

In order to maximize the advantage of the CHO for IAB, the IAB-MT should "trigger" the CHO when receiving the BH RLF notification ("recovery failure").

Proposal 2: RAN2 should agree that the IAB-MT "triggers" the CHO when the CHO is configured and the BH RLF notification is received.

Table 1 indicates the CHO-related operation from the perspective of the IAB-MT (when the CHO is configured).

TABLE 1

|  | Before RLF | After RLF | Failure in RLF recovery |
|---|---|---|---|
| Problem with the BH link of the IAB-MT | When the CHO trigger condition (A3/A5) is satisfied, the CHO is triggered and performed. | When a CHO candidate cell is selected, the CHO is performed. | Enter the idle state |
| Problem with the BH link of the parent | None | None | When a CHO candidate cell is selected, the CHO is performed. Alternatively, the CHO is triggered and performed by Proposal 2. |

When Proposal 2 can be agreed on, a method for triggering the CHO when reception of the BH RLF notification ("recovery failure") is a problem. When receiving the BH RLF notification, the following options for the CHO evaluation can be taken into account.

Option 1: The IAB-MT considers the RSRP of the source cell to be a negative infinity [dBm].

Option 2: The IAB-MT considers that all the configured CHO execution conditions are satisfied.

The options are considered to be applicable only to a target cell configured for the CHO event A5.

Proposal 3: RAN2 should examine whether the IAB-MT considers the RSRP of the source cell to be a negative infinity (Option 1), or when CHO trigger conditions are configured, the IAB-MT considers that all the CHO configured trigger conditions are satisfied when the BH RLF notification is received (Option 2).

FIGS. 15 and 16 respectively illustrate examples of specification changes for Option 1 and Option 2 when Proposal 3 can be agreed on.

The invention claimed is:

1. A communication control method used in a cellular communication system, the communication control method comprising:
receiving, by a first relay node configured with conditional handover from a second relay node being a parent node of the first relay node, a notification based on a failure in a backhaul link between the second relay node and a parent node of the second relay node; and
performing, by the first relay node, processing for forcibly triggering the conditional handover based on the notification,
wherein the configuration of the conditional handover comprises a candidate cell for handover and a trigger condition for the handover, the triggered condition being satisfied according to at least one of a measured value of a radio state and an offset value added to the measured value, the radio state including a radio state of a serving cell where the first relay node connects, and
the performing the processing comprises changing the at least one of the measured value of the radio state and the offset value so as to satisfy the trigger condition.

2. A communication control method used in a cellular communication system, the communication control method comprising:
receiving, by a first relay node configured with conditional handover from a second relay node being a parent node of the first relay node, a notification based on a failure in a backhaul link between the second relay node and a parent node of the second relay node; and
performing, by the first relay node, processing for forcibly triggering the conditional handover based on the notification,
wherein the configuration of the conditional handover comprises a candidate cell for handover and a trigger condition for the handover, and the performing the processing comprises triggering the conditional handover without making a determination whether the trigger condition is satisfied for the candidate cell.

3. A communication control method used in a cellular communication system, the communication control method comprising:
receiving, by a first relay node configured with conditional handover from a second relay being a parent node of the first relay node, a failure occurrence notification indicating occurrence of a failure in a backhaul link between the second relay node and a parent node of the second relay node;
determining whether the failure occurrence notification is received from the second relay node a predetermined number of times or more within a predetermined time; and
in response to determining that the failure occurrence notification is received from the second relay node the predetermined number of times or more within the predetermined time, performing, by the first relay node, triggering the conditional handover for a candidate cell.

* * * * *